Figure 1:
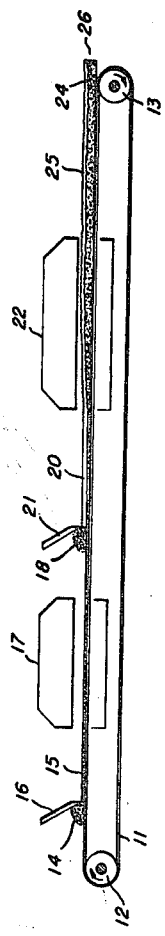

Feb. 9, 1965   P. C. WETTERAU   3,169,088
TEXTURED FOAM SURFACE COVERING
Original Filed Nov. 18, 1957   3 Sheets-Sheet 1

INVENTOR.
PAUL C. WETTERAU
BY
ATTORNEY

Feb. 9, 1965   P. C. WETTERAU   3,169,088
TEXTURED FOAM SURFACE COVERING
Original Filed Nov. 18, 1957                3 Sheets-Sheet 3
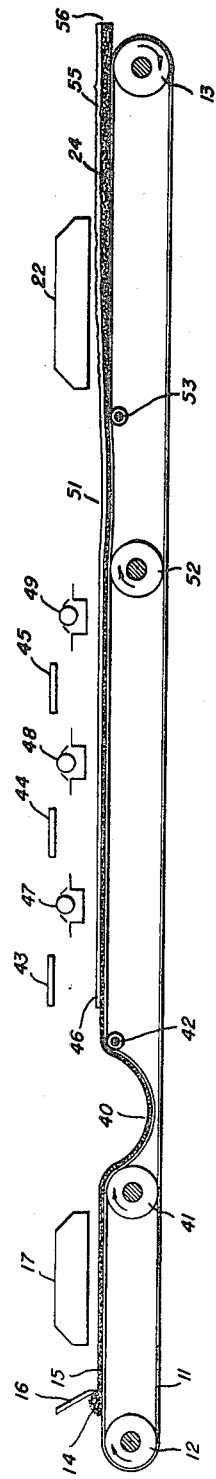
INVENTOR.
PAUL C. WETTERAU
BY
ATTORNEY

United States Patent Office 3,169,088
Patented Feb. 9, 1965

3,169,088
TEXTURED FOAM SURFACE COVERING
Paul C. Wetterau, Mountain Lakes, N.J., assignor to Congoleum-Nairn, Inc., Kearny, N.J., a corporation of New York
Original application Nov. 18, 1957, Ser. No. 697,226, now Patent No. 2,918,702, dated Dec. 29, 1959. Divided and this application Aug. 6, 1959, Ser. No. 832,017
3 Claims. (Cl. 161—114)

This invention relates to flexible surface coverings which have a plastic decorative wear layer applied to a resilient foam back and particularly to a method of producing such coverings.

This application is a division of my copending application filed November 18, 1957, and which issued December 29, 1959, as United States Patent 2,918,702.

In accordance with present commercial practice, flexible plastic surface coverings having a wear layer containing a thermoplastic synthetic resinous binder, plasticizers, pigments and fillers are widely used as coverings for floors, walls, vehicle interiors and the like in the form of sheets or tiles. Vinyl resins such as polyvinyl chloride and its copolymers, particularly vinyl chloride copolymerized with vinyl acetate, are most commonly used in formulating synthetic resinous binders used in the production of such plastic surface coverings. When resins are blended with plasticizers, pigments, fillers and the like and sheeted, products with excellent wearing properties and resistance to attack by ordinary household chemicals are produced. These products have an unusual clarity and brilliance of color, and the relatively low cost of vinyl resins make them ideally suited for production of surface coverings having a large market.

A major source of competition for products of this type in the residential floor covering field is from soft surface woven and tufted carpeting. Carpeting has the desirable attribute of being soft and comfortable under foot. Plastic surface coverings of the type described above are highly flexible and appreciably softer than wood or stone flooring materials, but they still do not possess the softness and comfort of carpeting. Consequently, considerable work has been done in an attempt to impart to flexible plastic surface coverings a high degree of resilience. A backing of felted fibers can improve the resilience of a plastic surface covering, but the degree of improvement is minimized when the felt is impregnated with waterproofing and strengthening saturants. Impregnation is required to impart to the felt sufficient strength to withstand processing and to improve dimensional stability in the presence of moisture. Felt backed surface coverings also have the disadvantage that they tend to become permanently deformed when subjected to heavy loads due to the poor recovery properties of the felt.

Products with greatly improved resilience have been made by the application of a thin foam rubber layer to the back of a flexible plastic surface covering. This product is conventionally made by the application of a foamed rubber latex to the felt backing of the felt-backed plastic surface covering. Since this product has an intermediate felt layer, it tends to suffer from the inherent disadvantage of all felt-backed products, that is, poor recovery after removal of a heavy load. Also, the presence of an intermediate felt layer presents a potential area of susceptibility to delamination. A plastic surface covering can be directly laminated to thin foam rubber by means of an adhesive to produce a highly resilient product, but this product also has the weakness of being susceptible to delamination at the adhesive bond.

A further desirable attribute of carpeting is its three-dimensional textured appearance. The conventional flexible plastic surface covering has a smooth glossy appearance. Such a product is highly desirable installed in certain locations, but there are areas and decorating styles that are suited to the use of a textured-surface product for both floors and walls. The imparting of texture to a flexible plastic surface covering has been attempted by the various techniques of embossing, but these, in general, have not proved too satisfactory and require the use of expensive embossing rolls.

It is an object of the invention to produce a plastic surface covering having resilience under foot coupled with a textured appearance. Another object of the invention is to produce a highly resilient textured-surfaced plastic product having resistance to delamination.

In accordance with the invention a decorative textured resilient plastic product is produced by applying a decorative plastic layer to a gelled foamable plastisol composition base and thereafter heating the mass to foam the plastisol and fuse the resins in both layers into an integral unitary sheet. The invention is illustrated on the accompanying drawings wherein FIGURES 1, 3 and 5 show schematic representations of three embodiments of the production of a textured resilient plastic surface covering in accordance with the invention and FIGURES 2 and 4 are enlarged views of the product produced by the methods illustrated in FIGURES 1, 3 and 5.

Figure 2:
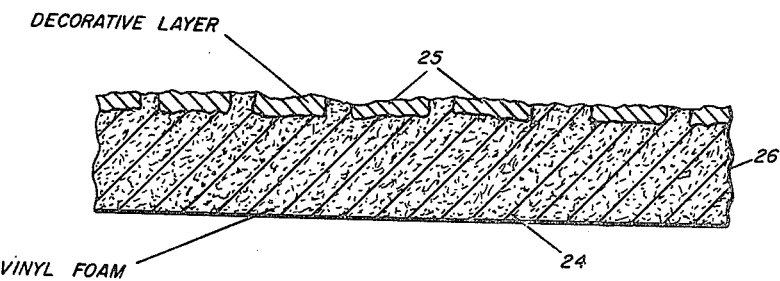

With reference to FIGURE 1, a thin endless carrier belt 11 is driven around rolls 12, 13. A mass of foamable plastisol composition 14 is formed into a layer 15 having controlled thickness by means of a doctor blade 16. The formed layer is carried by the motion of the endless belt through a hot air oven 17 wherein the plastisol is gelled. A mass of foamable resinous composition 18 is formed into a layer 20 of controlled thickness on top of the gelled plastisol layer by means of a doctor blade 21 and the resulting composite mass is passed through a hot air fusion oven 22 wherein the gelled plastisol layer foams and the resins in both layers fuse, thereby bonding both layers together. A foamed plastisol layer 24 forms the resilient backing for the product 26 and gas migration into the upper layer imparts texture thereto, forming an upper textured layer 25, as illustrated in greater detail in FIGURE 2. The upper layer is cracked and discontinuous in areas, exposing the lower foamed layer to view.

Figure 3:
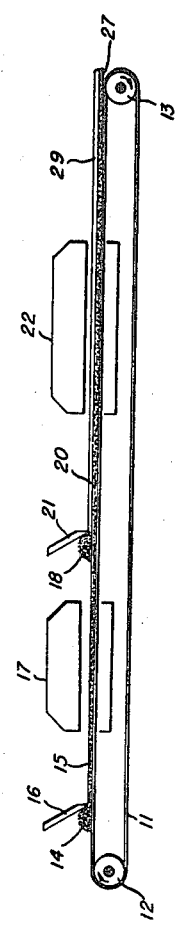
Figure 3:
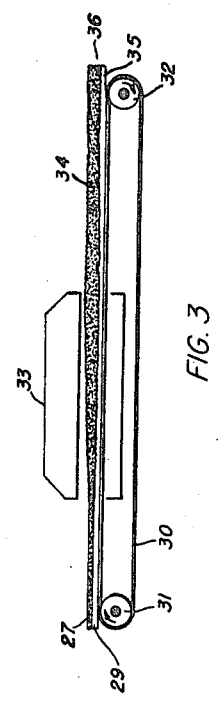
Figure 4:
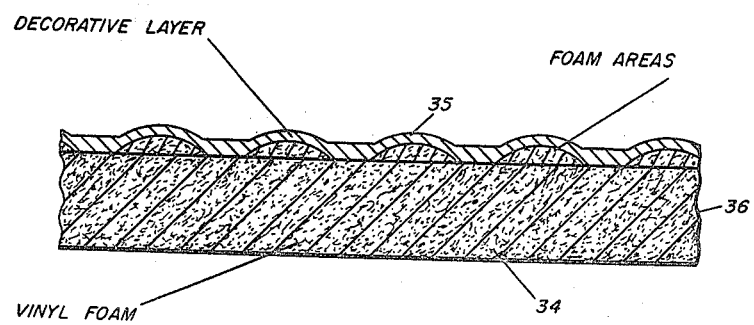

In the embodiment illustrated in FIGURE 3, a two layer sheet is formed as described above in reference to FIGURE 1. The temperature in the fusion oven 22 is controlled so that the resins in the product fuse and the gelled plastisol layer partially but not completely foams. The product bearing a decorative layer 29 formed and fused on a partially foamed backing layer 27 is inverted so that the decorative layer is carried on an endless carrier belt 30 driven by rolls 31, 32. The composite sheet passes through an oven 33 maintained at a temperature sufficient to complete the foaming of the layer 27. A composite product 36 bearing a plain foamed layer 34 and a decorative layer 35 having a slightly textured appearance leaves the oven 33 and passes to storage. As illustrated in FIGURE 4, the decorative layer has a slight three-dimensional appearance in the form of small protuberances extending above its surface, but is not cracked and fissured as is the product illustrated in FIGURE 2.

In the embodiment illustrated in FIGURE 5, the decorative layer is applied by printing on the gelled plastisol deposited on the belt in the same manner as recited above for FIGURE 1. A loop 40 between rolls 41, 42 creates slack in the system so that continuous sheet motion through the oven 17 is converted to intermittent motion necessary for the printing operation. Printing blocks 43, 44, 45 apply a decorative layer 46 to the gelled plastisol layer. The printing blocks are associated with paint pots 47, 48, 49 which apply a film to the printing blocks prior to printing. A loop 51 between rolls 52, 53 creates slack so that intermittent sheet motion during printing is converted to continuous sheet motion through the fusion oven 22. A product 56 comprising a printed decorative surface layer 55 and a foam backing leaves the fusion oven and passes to storage. The decorative layer is cracked in the same manner as the product of FIGURE 2, differing only in being multi-colored in the form of a printed design.

In operation, the belt is driven continuously by roll 41 and intermittently by roll 52, with loops 40 and 51 providing means for converting the sheet motion. When the sheet is in motion in the printing section, the paint pots reciprocate longitudinally beneath the printing blocks and deposit a film of paint on the printing surfaces of the blocks. The sheet motion stops and the printing blocks are depressed onto the gelled plastisol, thereby depositing a decorative film thereon. Each block prints a different color in the conventional manner of a flat bed printing machine.

The carrier belt upon which the foamable composition is applied in accordance with the invention preferably has a smooth polished surface. It can be coated with a conventional releasing fluid, such as a silicone, a wax, heavy metal salt of a high molecular weight fatty acid, such as aluminum stearate, zinc palmitate and the like. Alternately, a thin layer of a release paper, that is a paper sheet impregnated with a release fluid, can be placed on the carrier surface and the foamable composition applied thereto. In some cases, no releasing medium need be used if the carrier surface is thoroughly cooled prior to the stripping of the product therefrom at the end of the process.

The carrier surface can be in the form of an endless belt as shown on the drawing where a surface covering is produced in a continuous process. The carrier surface can also be in the form of a slab or other appropriate configuration if desired. Metal is the preferred material since a metal carrier is strong and durable, yet flexible. The carrier can also be formed of other materials, such as plastic, rubber and the like. The carrier must be able to withstand temperatures up to about 450° F. without being deformed and should be flexible for a continuous process.

The base layer which is initially applied to the carrier belt is a layer of foamable resinous composition. Suitable foamable compositions comprise a thermoplastic resinous binder and a substance which is decomposed by heat to yield a foam producing gas. The resinous binder must be one that is coalesced or fused into a continuous film by the application of heat. The preferred resinous binders are the vinyl resins, but other thermoplastic resins can be used such as polymers and copolymers of acrylic acid and methacrylic acid and their derivatives, polystyrene, polymerized methyl styrene, polybutadiene and the like. The foamable resinous composition is most conveniently applied as a liquid which is doctored or otherwise applied to the carrier in a controlled thickness film, as illustrated in FIGURES 1, 3 and 5. For liquid application, the resinous binder and blowing agent are dispersed in a dispersion medium. The resinous binder and blowing agent can be dispersed in water to form an aqueous latex, but the preferred dispersion medium is a fluid plasticizer for the thermoplastic resin. Such a dispersion of resin in a plasticizer is conventionally termed a plastisol.

A plastisol is a uniform dispersion in a plasticizer of a thermoplastic resin in the form of fine particles. Small amounts of pigments and stabilizers can be present. A plastisol has appreciable fluidity at normal room temperatures but is converted by heat into a flexible, hard thermoplastic mass. This ultimate result is brought about by the process of fusion wherein the resin becomes plasticized and solvated by the plasticizer.

Polymers of vinyl chloride have been found to be particularly effective in formulating plastisol compositions for use in the invention. The vinyl chloride polymers can either be simple, unmixed homopolymers of vinyl chloride or copolymers thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of another monomer is copolymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ester, vinyl isopropyl ethers, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like.

Resins adaptable for use in formulating vinyl chloride plastisols are commonly referred to as dispersion grade resins. Such resins are available having particle sizes of from 0.02 to about 2 microns in contrast to calender grade vinyl chloride resins which are available in particles ranging up to 35 microns in size. Dispersion grade resins are usually of higher molecular weight than calender grade resins and have particle surfaces of a hard, horny nature.

Polymers of vinyl chloride having specific viscosities above about 0.17 and preferably between 0.17 and 0.31 as measured in a solution of 0.2 gram of resin in 100 milliliters of nitrobenzene at 20° C. are particularly effective.

In the determination of specific viscosities the sample of resin in nitrobenzene solution maintained at a temperature of 20° C. is allowed to flow between two calibrated marks in a pipette and time required is recorded. This time is compared with the time required for a control of pure nitrobenzene solvent to pass between the same two marks, also at a temperature of 20° C. the specific viscosity is determined as the sample flow time divided by the control flow time, minus 1. The specific viscosity is an effective measure of relative molecular weight of the polymer, the higher the specific viscosity the higher being the molecular weight.

In the formulation of plastisol compositions for use in the invention, the fine particle size resin is uniformly dispersed in liquid plasticizer. The fluidity of plastisols is influenced in part by the particular resin selected but is also a function of the ratio of plasticizer to resin. Plastisols become less fluid as the ratio of plasticizer is reduced. Plastisols for use in the invention contain from about 50 to about 150 parts plasticizer per 100 parts resin. The fluidity of plastisols can also be controlled by the addition of small amounts of a volatile diluent not exceeding about 10 percent of the composition by weight.

Suitable plastisol compositions for the preparation of base layers for use in the invention have a viscosity of about 200 to about 25,000 centipoises as measured with a Brookfield viscometer using a number 6 spindle at 10 r.p.m. Plastisols within this viscosity range can be formed into a controlled thickness film by means of a doctor blade. Plastisols having higher viscosities can be used although the high viscosity necessitates the use of a technique such as calendering for film formation.

The selection of the plasticizer is important in determining the strength and flexibility of the wearing surface of the product and also in influencing the viscosity and viscosity stability of the plastisol. Esters of straight and branched chain alcohols with aliphatic acids impart low viscosity and good viscosity stability to a plastisol. Typical plasticizers of this type include dibutyl sebacate, dioctyl sebacate, dioctyl adipate, didecyl adipate, dioctyl azelate, triethylene glycol di(2-ethylhexanoate), diethylene glycol dipelargonate, triethylene glycol dicaprylate and the like. Plasticizers of the aromatic type, such as esters of aliphatic alcohols and aromatic acids or aromatic alcohols and aliphatic acids or aromatic alcohols and aromatic acids can be used although the use of highly aromatic plasticizers is limited by their tendency to yield plastisols of high viscosity. Typical plasticizers of this type include dibutyl phthalate, dicapryl phthalate, diactyl phthalate, dibutoxy ethyl phthalate, dipropylene glycol dibenzoate, butyl benzyl sebacate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight aromatic hydrocarbon condensates and the like can also be used. The plasticizer or blend of plasticizers is chosen to yield a plastisol of the desired viscosity and foaming characteristics. In addition, the plasticizer should have a low vapor pressure at the temperatures required to fuse the resin. A vapor pressure of 2 millimeters of mercury or less at 400° F. is satisfactory.

Minor amounts of stabilizers which are incorporated to reduce the effects of degradation by light and heat are present in the composition. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium strontrium and the like, glycerine, leucine, alanine, o- and p-amino benzoic and sulfanilic acids, hexamethylene tetramine, weak acid radicals including oleates, recinoleates, abietates, salicylates and the like. Normally, the plastisol contains from 0.5 to 5 parts stabilizer per 100 parts resin. The particular stabilizers chosen should not impart excessive viscosity to the printing composition.

The foamable plastisol composition for use in the invention contains an effective amount of a blowing agent. The larger the amount of blowing agent within practical limits used the greater is the expansion of the foam. Foam densities of from 10 percent to 50 percent of the density of the unblown plastisol can be readily attained. Such results are attainable with from about 1 to about 20 parts blowing agent per 100 parts resin with from 2 to 10 parts blowing agent per 100 parts resin being particularly effective for the production of foams of a density which are most desirable for use in producing surface coverings in accordance with the invention.

Complex organic compounds which when heated decompose to yield an inert gas and have residues which are compatible with the resins in the plastisol are used as blowing agents. Such materials have the property of complete decomposition over a narrow temperature range which is particularly desirable for obtaining a good foam structure. Compounds having the >N—N< and —N=N— linkages decompose at elevated temperatures to yield an inert gas high in nitrogen. Typical compounds include substituted nitroso compounds, substituted hydrazides, substituted azo compounds and the like, such as are tabulated below.

| Blowing agent: | Decomposition temperature, ° F. |
|---|---|
| P,P'-oxybis-(benzenesulfonyl hydrazide) | 300–320 |
| N,N'-dimethyl-N,N'-dinitroso terephthalamide | 200–220 |
| Dinitrosopentamethylenetetramine | 355–375 |
| Azodiformamide | 370–390 |

Blowing agents for use in the invention must be decomposed at a temperature below the decomposition temperature of the resin used. Therefore, in the case of plastisols formulated with the preferred vinyl chloride polymers, a blowing agent decomposing below 450° F. must be used. The minimum initial decomposition temperature must be sufficiently high that no premature gas evolution occurs during formulation of the plastisol and subsequent processing. Any premature decomposition of the blowing agent renders the application of a uniform layer to the carrier difficult. In addition, the minimum initial decomposition temperature of the blowing agent should be above the temperature at which the plastisol attains some strength through gelation. In the case of the preferred vinyl chloride polymer plastisols, the minimum initial decomposition temperature of the blowing agent should be at least 200° F.

The use of a blowing agent which does not begin to decompose until the fusion temperature of the polymer is particularly effective in the production of products in accordance with the invention. When a high temperature blowing agent of this type is used, such as azodiformamide, the decorative and base layers of the product become integrally bonded together into a unitary sheet prior to any foaming of the base layer. This affords better control of the texture produced in the decorative layer by the evolution of gas, since the resinous compositions have attained greater strength through fusion.

In accordance with the invention, the foamable plastisol composition containing a blowing agent is applied to the carrier web either as a liquid which is doctored or otherwise coated into a thin film or as a preformed sheet. When a film is applied by coating, the composition is heated in order to gel the plastisol so that when subsequently cooled it will have sufficient strength and rigidity to permit application of a decorative layer. This gelling step is normally carried out in a conventional hot air oven maintained at a temperature of about 200° F. in the case of a preferred vinyl chloride polymer plastisol. In the oven a rapid flow of the hot gases around the sheet insures that the entire sheet attains a uniform temperature. Normally, residence in the hot air oven from about 1 to about 5 minutes will insure satisfactory gellation of the plastisol. The foamable plastisol can also be applied to the carrier base as a preformed sheet produced by any conventional sheet forming techniques. For example, a plastisol composition containing a blowing agent can be gelled and then calendered into a smooth uniform sheet. Alternately, sheet formation can take place in a press. It is important that the composition not be subjected to excessive temperatures during sheet formation to prevent premature decomposition of the blowing agent.

The gelled plastisol layer is cooled and the decorative layer is then applied thereto. The decorative layer can be applied as a liquid film, as for example, by printing or doctoring or can be applied in the form of a preformed decorative sheet. The doctoring of a liquid composition is a convenient method of applying a decorative layer when a solid color effect is desired. Printing can be used when a more intricate decorative effect is to be created. The application of the decorative layer in the form of a preformed decorative sheet is desirable when a relatively thick wearing surface is desired.

When the decorative layer is applied as a liquid film, it can be in the form of either a pigmented plastisol or organosol composition. The composition should be compatible with the gelled plastisol base and accordingly, it is preferred that the resinous binder in the decorative layer be a polymer or copolymer of vinyl chloride as described in connection with the plastisol composition above. A composition adaptable for application as a liquid film will normally have a viscosity at 25° C. of from about 200 to 25,000 centipoises as measured with a Brookfield viscometer using a No. 6 spindle at 10 r.p.m. A suitable plastisol comprises from 50 to 150 parts plasticizer per 100 parts resin. Plasticizers and mixtures of plasticizers as described in connection with the plastisol base layer are useful in formulating a plastisol decorative composition. The composition also contains heat and light stabilizers as described above and is pigmented in accordance with the particular color desired. Any of the organic and inorganic pigments which are normally used in connection with pigmented resinous compositions are useful in forming a decorative plastisol.

A decorative fluid film can also be formulated as an organosol, which is similar in nature to a plastisol except that a portion of the plasticizer is replaced with a volatile organic solvent. The resin in an organosol is present in the form of finely divided particles uniformly dispersed throughout the composition in the same manner as the resin is present in a plastisol. In formulating an organosol for use as a decorative layer in accordance with the invention, it is preferred that the resin be a polymer or copolymer of vinyl chloride as described in connection with the plastisol base layer. This insures maximum compatibility and adhesion between the layers in the finished product. Useful organosols contain from about 20 to about 150 parts plasticizer per 100 parts of resin, and any of the plasticizers or mixtures of plasticizers described in connection with the plastisol base layer are useful. The organosol composition also contains from about 1 to about 80 parts of volatile organic solvent per 100 parts of resin with the amount chosen in accordance with the particular viscosity desired. Such solvents as xylene, toluene, cyclohexanone, methyl ethyl ketone, methyl isobutyl ketone and the like are useful. The organosol also contains minor amounts of heat and light stabilizers as described in connection with the plastisol base layer and contains suitable pigments in accordance with the particular color desired.

The organosol or plastisol decorative layer can be applied either by a doctor blade or other conventional coating equipment or by any of the conventional techniques of printing. When a multicolored decoration is applied by printing, a separate batch of fluid plastisol or organosol composition must be formulated in each of the colors to be used. Printing can be by either flat bed or rotary printing techniques. When a flat bed printing machine is used of the type well known for the manufacture of enamel surface printed felt base floor coverings, the continuous sheet motion necessary before and after the printing operation must be converted to the intermittent motion required during printing. Continuous motion before and after is required in order that the plastisol gelling and product fusing and foaming operations can be adequately controlled. Various slack loops or festooning systems can be used in order to make this conversion.

When a relatively thick decorative layer is desired in the finished product, it is usually preferable to apply it in the form of a preformed sheet of resinous composition. The preformed sheet can be formed by any of the conventional techniques of plastic sheet formation, such as calendering, pressing and the like. Alternately, a fluid film, as for example, a plastisol or organosol, can be cast upon a surface and then gelled in order to attain sufficient mechanical strength to be handled as a sheet.

When a resinous composition is to be applied as a decorative layer in the form of a preformed sheet, it is preferred that the resinous binder be a polymer or copolymer of vinyl chloride as described in connection with the plastisol base composition. When the sheet is to be formed by calendering or pressing, a pigmented viscous plastisol can be used or a filled vinyl plastic composition of the type disclosed in Patent 2,558,378, which issued to Robert K. Petry on June 26, 1951.

The composite sheet comprising the gelled plastisol base and the decorative layer applied thereto is heated in order to foam the plastisol base and fuse the compositions of the two layers into a unitary sheet. It is necessary that the product be heated to the fusion temperature of the resinous compositions used and also to a sufficiently high temperature that the blowing agent in the plastisol base is decomposed. Depending on the decomposition temperature of the particular blowing agent used foaming can either occur before fusion, simultaneously with fusion or after fusion. It has been found particularly desirable to use a high temperature blowing agent in the plastisol base composition for optimum control of foam structure and product texture. Under these conditions, foaming does not occur until the resinous compositions have been substantially completely fused.

In accordance with one embodiment of the invention, the composite sheet can be passed directly to the fusion oven after the application of the decorative layer. The temperature in the oven can be controlled so that complete decomposition of the blowing agent occurs. In another embodiment of the invention, the temperature in the oven is controlled so that fusion is completed but only slight or no decomposition of the blowing agent is effected. The fused product is then removed from the carrier belt, inverted and placed on a second moving carrier belt with the gelled and fused plastisol base layer facing upward. The sheet in this condition is then passed through a second oven wherein the blowing agent is completely decomposed. In accordance with the first embodiment, the gas liberated by the decomposition of the blowing agent not only expands and foams the base plastisol layer but also migrates into the decorative layer imparting a textured effect thereto. When an organosol having a relatively low proportion of plasticizer to resin is used, the decorative layer can actually crack to form fissures through which portions of the base foamed layer protrudes, giving a most unusual appearance in the product. In accordance with the second embodiment of the invention, decomposition of the blowing agent liberates gas directly into the upward facing layer which is actually to be the base layer of the finished product. Thus, only a minor amount of gas is effective in the downward facing decorative layer so that the textured effect in the product is minimized. The textured effect in the second embodiment is limited to a plurality of small protuberances extending above the surface of the decorative layer.

The following examples are given for purposes of illustration:

Example I

A foamable plastisol was formulated by grinding the following formulation on a conventional three-roll mill:

| | Parts |
|---|---|
| Vinylidene chloride-vinyl chloride copolymer | 40 |
| Polyvinyl chloride | 60 |
| Didecyl adipate | 60 |
| Stabilizer | 3 |
| Finely divided titanium dioxide | 2 |
| Azodiformamide blowing agent | 3 |

This composition was applied to a polished metal surface as a film 0.006 inch in thickness. The film was placed in an oven at 225° F. for 2 minutes to gel the plastisol and the sheet was cooled to room temperature by exposure to the atmosphere.

A decorative organosol was formulated as follows:

| | Parts |
|---|---|
| Vinyl chloride-vinyl acetate copolymer | 100 |
| Dioctyl phthalate | 15 |
| Tricresyl phosphate | 15 |
| Mineral spirits | 20 |
| Methyl ethyl ketone | 2 |
| Blue-green pigment | 3 |
| Stabilizer | 5 |

This composition was applied as a 0.005 inch thick film to the gelled plastisol. The sheet was placed in an oven heated to 400° F. for 1 minute, thereby fusing both compositions and completely decomposing the blowing agent in the plastisol. The gelled plastisol expanded five-fold to a thickness of 0.030 inch and the decorative layer was puckered and cracked to yield a most unusual textured effect. The product showed no tendency toward delamination since the vinyl resins in both layers were fused and integrally bonded into a unitary mass.

*Example II*

A foamable plastisol was formulated by grinding the following formulation on a conventional three-roll mill.

| | Parts |
|---|---|
| Polyvinyl chloride | 100 |
| Didecyl adipate | 60 |
| Stabilizer | 3 |
| Finely divided titanium dioxide | 2 |
| Azodiformamide blowing agent | 5 |

This composition was doctored onto a smooth polished moving belt as a film 0.010 inch in thickness. The plastisol composition was gelled by heating in a 200° F. oven for 5 minutes and the gelled sheet was cooled by exposure to the atmosphere.

A decorative plastisol was formulated the same as the foamable plastisol except the blowing agent was replaced by 3 parts of blue-green pigment.

This composition was applied as a 0.010 inch thick film to the gelled foamable plastisol. The sheet was passed through an oven at 350° F. wherein the two layers became fused and bonded into a unitary sheet but with only slight decomposition of the blowing agent.

After being cooled to room temperature by exposure to the atmosphere the sheet was stripped from the metal belt and inverted on a second belt with the blue-green decorative side face down on the belt. The sheet was passed through a second oven maintained at 400° F. wherein the blowing agent in the upper plastisol layer was completely decomposed. The migration of gas into the decorative layer caused some texturing of the surface of the blue-green layer by forming protuberances in its surface.

The sheet was cooled by exposure to the atmosphere, stripped from the metal belt and again inverted. The plain foamed backing layer was 0.070 inch thick, representing a seven-fold foam expansion. The decorative blue-green layer was covered with a number of small protuberances imparting a textured effect to the product. The product showed no tendency toward delamination where the two layers were joined.

*Example III*

A pigmented filled vinyl composition having the following composition was blended in a Banbury mixer:

| | Parts |
|---|---|
| Polyvinyl chloride | 28 |
| Dioctyl phthalate | 13 |
| Wood flour | 24 |
| Whiting | 31 |
| Pigment | 4 |
| | 100 |

The mixture was sheeted between calender rolls at a temperature of 290° F. in the presence of particles of similar composition in contrasting colors, thereby producing a 0.020 inch thick calendered vinyl plastic sheet having a jaspe appearance.

The sheet was applied to the cooled gelled foamable plastisol layer prepared as indicated in Example I. The composite sheet was passed through an infra-red oven wherein the plastisol composition attained a temperature of 390° F., thereby completely decomposing the blowing agent in the plastisol, fusing the plastisol and bonding it integrally to the upper calendered vinyl sheet. The decorative sheet was puckered and cracked by the heat and gas migration from the lower plastisol layer to produce an unusual decorative effect. The plastisol was expanded to a thickness of 0.030 inch or a five-fold increase.

Any departure from the forgoing specification that conforms to the invention is intended to be included within the scope of the claims.

I claim:

1. A resilient flexible decorative plastic sheet comprising a backing layer of fused vinyl chloride resinous composition foam integrally bonded to a decorative layer of vinyl chloride composition compatible with said vinyl chloride composition, said decorative layer having a wrinkled textured surface formed by areas of small protuberances of cellular structure which extend throughout the entire thickness of the decorative layer.

2. A resilient flexible decorative plastic sheet which comprises a backing layer of fused vinyl polymer composition foam integrally bonded to a decorative layer of thermoplastic resinous composition compatible with said vinyl polymer composition, said decorative layer having a wrinkled textured surface formed by areas of small protuberances of cellular structure extending throughout the entire thickness of said layer and having a plurality of openings extending through said decorative layer filled with said fused vinyl polymer foam composition.

3. A resilient flexible decorative plastic sheet which comprises a backing layer of fused vinyl chloride polymer composition foam integrally bonded to a decorative layer of thermoplastic resinous composition compatible with said vinyl chloride polymer composition, said decorative layer having a wrinkled textured surface formed by areas of small protuberances of cellular structure and having a plurality of openings extending through said decorative layer filled with said fused vinyl chloride polymer foam composition.

References Cited in the file of this patent

UNITED STATES PATENTS

| | | |
|---|---|---|
| 2,409,629 | Hertiage | Oct. 22, 1946 |
| 2,548,029 | Kurtz et al. | Apr. 10, 1951 |
| 2,565,491 | Francis | Aug. 28, 1951 |
| 2,816,852 | Banks | Dec. 17, 1957 |
| 2,841,515 | Runton | July 1, 1958 |
| 2,853,411 | Riley | Sept. 23, 1958 |
| 2,920,977 | Adams | Jan. 12, 1960 |
| 2,940,887 | Daly et al. | June 14, 1960 |
| 2,962,407 | Aykanian | Nov. 29, 1960 |
| 2,996,409 | Lavely | Aug. 15, 1961 |

FOREIGN PATENTS

| | | |
|---|---|---|
| 466,452 | Great Britain | May 28, 1937 |
| 754,952 | Great Britain | Aug. 15, 1956 |